(12) United States Patent
Resing et al.

(10) Patent No.: US 7,062,896 B2
(45) Date of Patent: Jun. 20, 2006

(54) GATHERING AND PICKING DEVICE HAVING A CURVED PICKING GAP

(75) Inventors: Alfons Resing, Stadtlohn (DE); Richard Wuebbels, Rhede (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 0 days.

(21) Appl. No.: 10/662,695

(22) Filed: Sep. 15, 2003

(65) Prior Publication Data

US 2004/0128968 A1  Jul. 8, 2004

(30) Foreign Application Priority Data

Oct. 4, 2002   (GB) ................. 102 46 419

(51) Int. Cl.
*A01D 45/02*   (2006.01)
(52) U.S. Cl. ............................. 56/64; 56/104
(58) Field of Classification Search ............. 56/64–65, 56/73, 94–96, 99, 103–105, 116, 119
See application file for complete search history.

(56) References Cited

U.S. PATENT DOCUMENTS

| | | | |
|---|---|---|---|
| 851,059 A * | 4/1907 | Broome | 56/119 |
| 5,832,707 A * | 11/1998 | Arnold et al. | 56/66 |
| 6,119,443 A * | 9/2000 | Rauch | 56/64 |
| 6,374,587 B1 | 4/2002 | Wubbels et al. | 56/103 |
| 6,430,907 B1 | 8/2002 | Wolters et al. | 56/64 |
| 6,487,839 B1 * | 12/2002 | Wubbels et al. | 56/64 |
| 2003/0079458 A1 | 5/2003 | Wubbels et al. | 56/52 |
| 2003/0079459 A1 * | 5/2003 | Bongert et al. | 56/104 |

FOREIGN PATENT DOCUMENTS

| | | |
|---|---|---|
| DE | 12 26 351 | 10/1966 |
| DE | 199 59 282 A1 | 6/2001 |
| DE | 100 09 199 A1 | 8/2001 |
| DE | 100 28 887 A1 | 12/2001 |
| DE | 101 53 198 A1 | 5/2003 |
| EP | 1 106 048 A1 | 6/2001 |
| EP | 1 161 857 A1 | 12/2001 |

* cited by examiner

*Primary Examiner*—Meredith Petravick

(57) ABSTRACT

A gathering and picking device having a gathering element having radially extending fingers is rotated about an approximately vertical axis. The fingers are arranged to grasp plant stalks and transport the plant stalks along a picking gap of a picking device. The picking gap is curved such that it maintains an at least approximately constant distance from the vertical rotational axis of the gathering element over its operative length.

3 Claims, 2 Drawing Sheets

GATHERING AND PICKING DEVICE HAVING A CURVED PICKING GAP

FIELD OF THE INVENTION

The present invention is directed to a gathering and picking device with a gathering element which is rotated about an approximately vertical axis, that is arranged to grasp plant stalks and transport them along a picking gap of a picking device.

BACKGROUND OF THE INVENTION

Published U.S. Patent application US2003/0079458 published 1 May 2003 discloses a gathering and picking device. The gathering element is rotatable about an approximately vertical axis and is provided with radially extending fingers arranged to insert plant stalks into a picking gap and to transport the plants stalks over the length of the picking gap. Two picking rolls are arranged underneath the picking gap. The picking gap is defined by a stripper plate. The picking gap is made straight over nearly its entire length, and is curved in the direction of the rotational axis of the gathering element only at its end, while the picking gap widens in the shape of a funnel upstream of its inlet region. During the harvest, the gathering element grasps the plants with its fingers, with the plants being initially transported into the picking gap laterally, and then rearwardly. At the inlet region and the end region of the picking gap, the leading surface of a finger forms an angle of approximately 45 degrees with the picking gap, while the leading surface is oriented approximately perpendicular relative to the picking gap in its central region. This causes a relative movement, and acute angles, between the plants and the surface of the transport element in the inlet region and the end region of the picking gap. These relative movements and acute angles can lead to friction-related wear and transport problems.

SUMMARY OF THE INVENTION

It is an object of the present invention to provide an improved gathering and picking device in which the above-described disadvantages are eliminated.

It is a feature of the present invention that the picking gap is curved in an arc-like fashion around the rotational axis of the gathering element. This means that the picking gap has an essentially constant distance from the rotational axis of the gathering element over its effective length, i.e., the length over which the gathering element interacts with the plants.

Due to these measures, the relative movements between the plants and the gathering element are eliminated, or at least reduced, during the picking process. This means that the occurrence of friction and associated transport problems is reduced.

It is possible to provide the gathering element with conventional transport elements that are oriented more or less radially relative to the rotational axis of the gathering element. Due to the arrangement of the picking gap in accordance with the invention, an obtuse or even a right angle results between the surface of the transport element that comes in contact with the plants and the travel direction of the plant stalks along the picking gap. This eliminates lateral forces that bend the plants and could lead to transport problems.

The picking gap does not necessarily have to be realized such that it has a constant distance from the rotational axis of the gathering element over its entire length. The picking gap may be spaced apart from the rotational axis of the gathering element by a larger distance in its end region, which the plants only reach once they are almost completely drawn downward into the picking gap; i.e., the picking gap diverges outboard. This causes the uppermost plant parts to be moved out of the effective range of the gathering element. Then the plants are no longer additionally transported by the gathering element, but rather remain stationary and are drawn in downward through the picking gap.

One or two picking roll(s) is/are preferably arranged beneath the picking gap in order to draw in the plants. A single picking roll usually cooperates with a stationary surface. When using two picking rolls, they are driven in opposite directions such that the plant stalks are drawn in between the two rolls. The inlet region of the picking gap is preferably situated above the inlet zone of the picking roll or picking rolls; i.e., the regions of those that come in contact with the plants first. This is advantageous because the plants remain oriented vertically at this critical location, such that no problems arise when the plants are inserted into the picking gap and into the inlet zone of the picking roll or picking rolls. Downstream of the inlet region, the picking gap usually diverges more and more from the picking rolls such that the plants can be bent in the lateral direction. However, this lateral bending is usually unproblematic.

DETAILED DESCRIPTION

Figure 1:
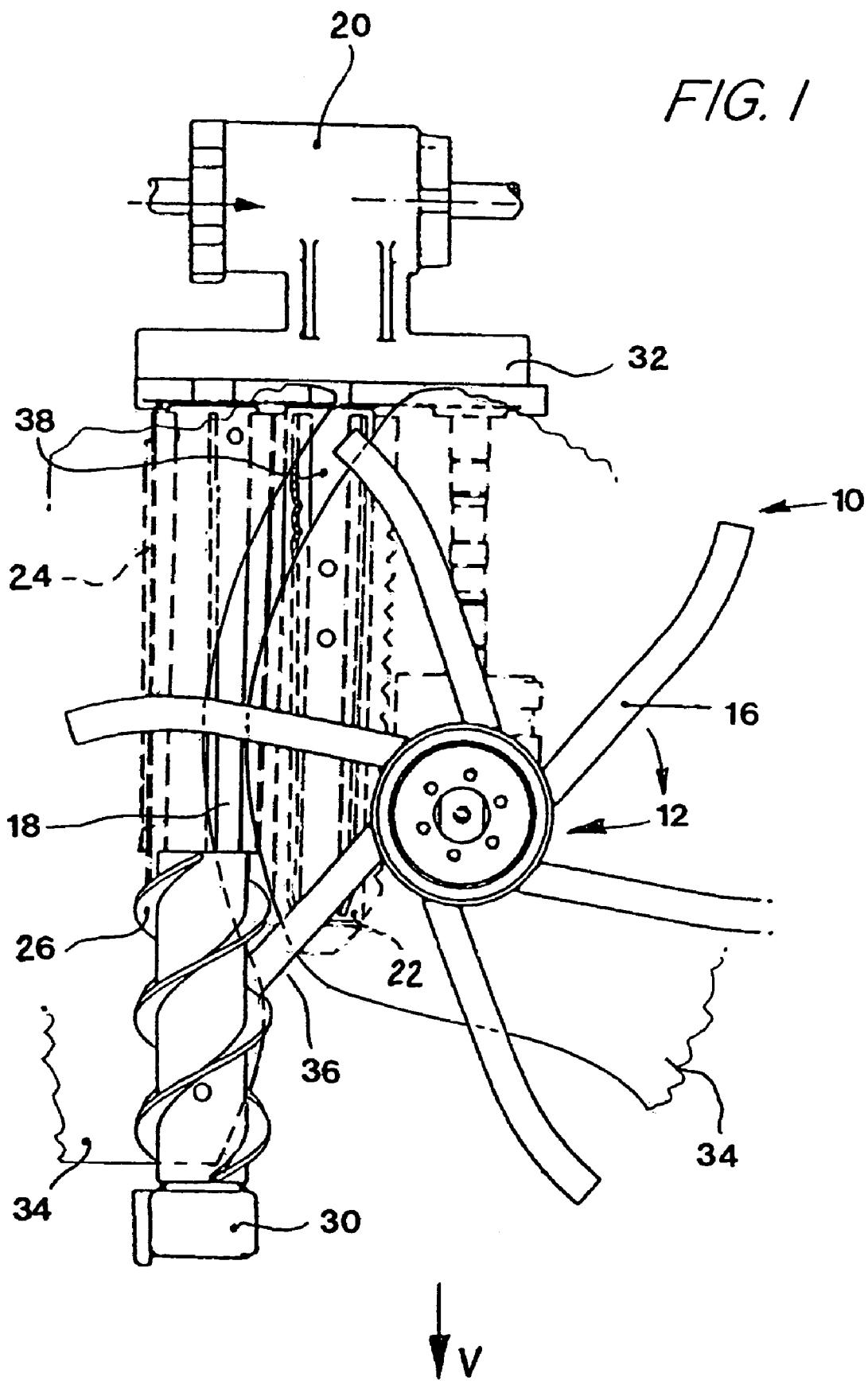
FIG. 1 is a top view of a gathering and picking device according to the invention.

FIG. 1 is a top view of a gathering and picking device 10. A harvesting machine comprises a series of identical gathering and picking devices 10 that are arranged laterally adjacent to one another. These gathering and picking devices 10 are connected to one another by a beam that is arranged at their rear, and is not illustrated in the figure. During the harvest, the beam is attached to the feeder house of a combine-harvester or the gathering channel of a field chopper, and the harvesting machine is driven over a field. The harvesting implement is moved in a forward direction V by the supporting harvesting vehicle through standing plants during a harvesting operation. In the following description, directional indications such as front, rear, bottom and top refer to the forward direction V of the gathering and picking device 10.

Figure 2:
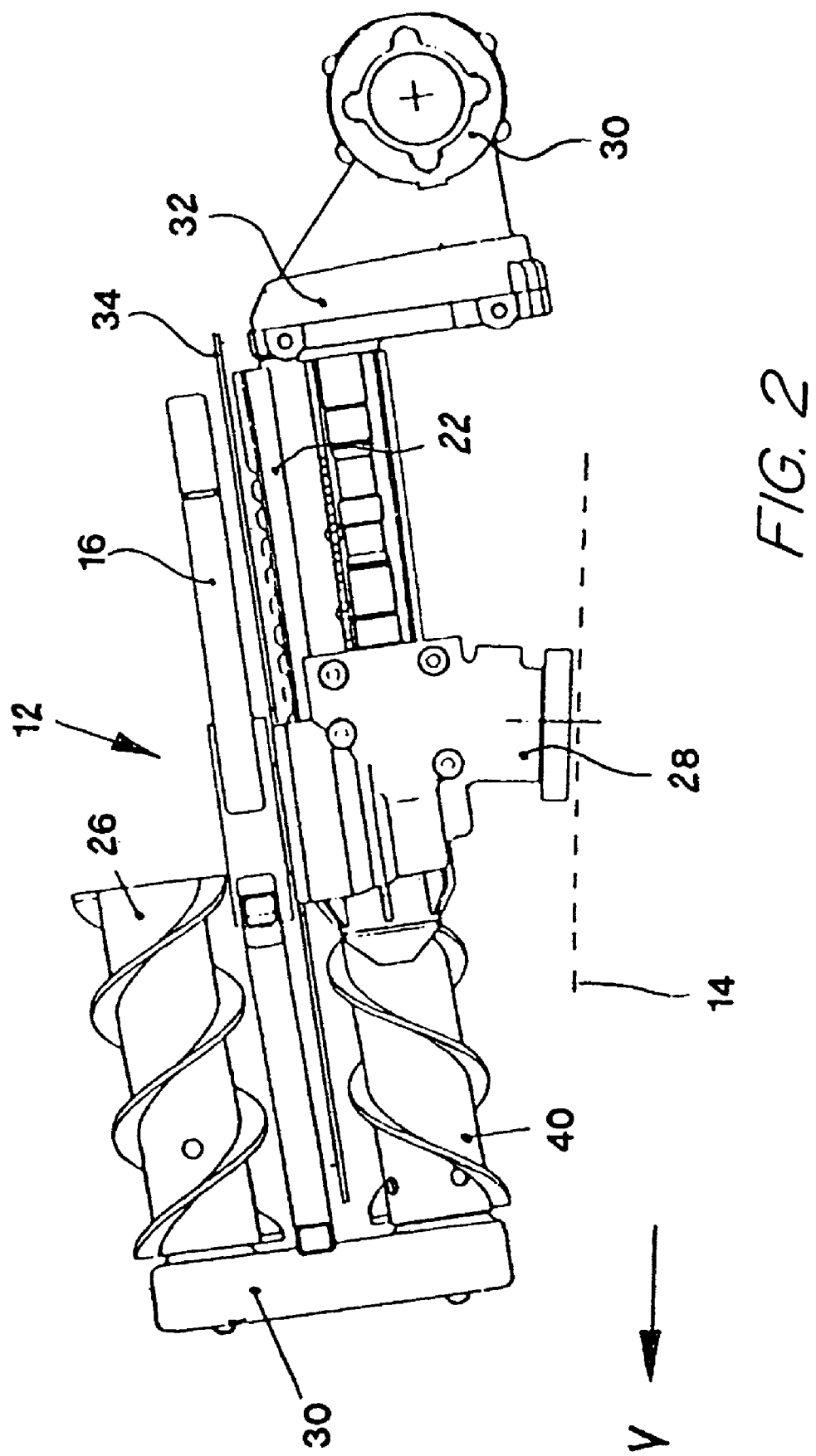
FIG. 2 is a side view of a gathering and picking device according to the invention.

The gathering and picking device 10 comprises a gathering element 12 that can be set into rotative motion about an axis that is approximately vertical, but is slightly inclined toward the front (see FIG. 2). This gathering element is provided with fingers 16 that project outward about radially, and the end regions of which are respectively curved in a trailing fashion, opposite to the direction of rotation in order to achieve a non-captive transport characteristic. A picking gap 18 is situated adjacent to the rotational axis of the gathering element 12, wherein two cooperating picking rolls 22 and 24 are arranged beneath the picking gap 18. An upper screw conveyor 26 is arranged above the picking gap 18 and above the fingers 16 on the side of the picking gap 18 opposite the gathering element 12. In order to simplify the insertion of the plant stalks into the picking gap 18, this upper screw conveyor has a faster transport speed than a lower screw conveyor 40 in the front region of the picking roll 24. The movable elements are set into rotative motion by means of suitable drives 20 and 28, wherein the screw conveyor 26 is driven by the picking roll 24 and gears within a gear housing 30 that is arranged on the front side of the picking roll 24 and of the upper screw conveyor 26. The picking gap 18 is provided in an approximately horizontal stripper plate 34 that is arranged beneath the fingers 16 and above the picking rolls 22 and 24.

A gear housing 32 accommodates the individual elements of the gathering and picking device 10. This gear housing 32 is mounted on the above-mentioned beam such that it can be laterally displaced.

According to FIG. 1, the picking gap 18 extends around the rotational axis of the gathering element 12 in an approximately circular fashion. Downstream of the inlet region 36 of the picking gap 18, the distance between the picking gap 18 and the rotational axis of the gathering element 12 is approximately constant over an angular range of 90 degrees. This angular range corresponds to the effective length of the picking gap 18, i.e., the length traveled by plants of normal height until they are drawn in downward by the picking rolls 22 and 24. In its rear end region 38, the picking gap 18 extends further outboard, i.e., it diverges from the rotational axis of the gathering element 12. This means that larger plants are no longer transported by the fingers 16 once they reach the end region 38, but are drawn downward by the picking rolls 22 and 24. Comparatively small plants are, however, already drawn downward before they reach the end region 38. The picking gap 18 is wider, in the shape of a funnel, upstream of the inlet region 36, such that plants that are not situated exactly in front of the inlet region 36, viewed in the forward direction V, are also transported into the picking gap 18. The inlet zone of the picking rolls 22 and 24 is defined by the front tip of the picking roll 22 and the rear end of the screw conveyor 40 of the picking roll 24, and is arranged beneath the inlet region 36.

The stalky plants standing on the field (e.g., corn or sunflowers) are, if applicable, laterally deflected during the harvest by the gathering element 12 into the picking gap 18. The plants reach the inlet region 36 while being guided by the curved front edge of the stripper plate 34 where the picking gap 18 is wider. At this location, the fingers 16 transport the plant stalks into the picking gap 18 and into the inlet zone of the picking rolls 22 and 24. This means that the plant stalk remains approximately vertical.

The plants are drawn downward into the picking gap 18 by rotation of the picking rolls 22 and 24 and are transported along the picking gap 18 by the fingers 16. As the cobs and like are separated from the plant stalk by the picking gap 18 they are deposited onto the stripper plate 34 to both sides of the picking gap 18. The harvested crop material is then transported rearward by the fingers 16 and introduced onto the feeder house or into the gathering channel of the harvesting machine by a lateral screw conveyor, not-shown. The rotating flails 14 chop up the plant stalks. The design and the function of the gathering and picking device 10 are disclosed in greater detail in published U.S. Patent application US2003/0079458 published 1 May 2003, the disclosure of which is hereby incorporated herein by reference.

The curvature of the picking gap 18 causes the surfaces of the fingers 16 to be oriented transverse to the picking gap 18 when they transport the plants along the picking gap 18. In addition, only a slight relative movement between the transport elements 16 and the adjoining plants occurs due to the constant distance between the rotational axis of the gathering element 12 and the picking gap 18 over the effective length of the picking gap 18. The plant is temporarily bent (toward the right relative to FIG. 1) during its transport along the picking gap 18 because its lower part is situated between the picking rolls 22 and 24. However, this lateral bending does not have any negative effects.

Having described the illustrated embodiment, it will become apparent that various modifications can be made without departing from the scope of the invention as defined in the accompanying claims.

The invention claimed is:

1. A gathering and picking device comprising: a gathering element, which is rotated about an approximately vertical rotational axis and is arranged to grasp plant stalks; a picking gap having an effective length, wherein the plant stalks are transported along the effective length of the picking gap by the gathering element; the picking gap is curved along the effective length such that the effective length of the picking gap is an essentially constant distance from the rotational axis of the gathering element; and wherein a picking roll is arranged beneath the picking gap, the picking roll having an inlet zone and the picking gap having an inlet region, the inlet zone of the picking roll is situated beneath the inlet region of the picking gap.

2. A gathering and picking device comprising:
   a gathering element, which is rotated about an approximately vertical rotational axis and is arranged to grasp plant stalks; a picking gap having an effective length, wherein the plant stalks are transported along the effective length of the picking gap by the gathering element; the picking gap is curved along the effective length such that the effective length of the picking gap is an essentially constant distance from the rotational axis of the gathering element; and
   wherein the gathering element is provided with fingers that extend radially outward from the rotational axis, wherein the fingers are oriented substantially perpendicular to the effective length of the picking gap; and
   wherein a picking roll is arranged beneath the picking gap, the picking roll having an inlet zone and the picking gap having an inlet region, the inlet zone of the picking roll is situated beneath the inlet region of the picking gap.

3. A gathering and picking device comprising:
   a gathering element, which is rotated about an approximately vertical rotational axis and is arranged to grasp plant stalks; a picking gap having an effective length, wherein the plant stalks are transported along the effective length of the picking gap by the gathering element; the picking gap is curved along the effective length such that the effective length of the picking gap is an essentially constant distance from the rotational axis of the gathering element;
   wherein the gathering element is provided with fingers that extend radially outward from the rotational axis, wherein the fingers are oriented substantially perpendicular to the effective length of the picking gap;
   wherein the picking gap has an end region outside the effective length, wherein the end region is spaced a greater distance from the rotational axis of the gathering element than the distance to the effective length of the picking gap; and
   wherein a picking roll is arranged beneath the picking gap, the picking roll having an inlet zone and the picking gap having an inlet region, the inlet zone of the picking roll is situated beneath the inlet region of the picking gap.

* * * * *